US010769215B2

(12) United States Patent
Punaganti Venkata et al.

(10) Patent No.: US 10,769,215 B2
(45) Date of Patent: Sep. 8, 2020

(54) METHOD, APPARATUS AND COMPUTER PROGRAM PRODUCT PROVIDING AN APPLICATION INTEGRATED MOBILE DEVICE SEARCH SOLUTION USING CONTEXT INFORMATION

(75) Inventors: Murali Krishna Punaganti Venkata, Vantaa (FI); Chand Malu, Vantaa (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 2066 days.

(21) Appl. No.: 11/182,934

(22) Filed: Jul. 14, 2005

(65) Prior Publication Data
US 2007/0016570 A1    Jan. 18, 2007

(51) Int. Cl.
| G06F 16/9535 | (2019.01) |
| G06F 16/951 | (2019.01) |
| G06F 16/9536 | (2019.01) |

(52) U.S. Cl.
CPC ........ G06F 16/951 (2019.01); G06F 16/9535 (2019.01); G06F 16/9536 (2019.01)

(58) Field of Classification Search
CPC ............... G06F 9/541; G06F 17/30867; G06F 17/30554; G06F 16/951; G06F 16/9535; G06F 16/9536
USPC ....... 707/722, 706, 707, 712, 793, 794, 804, 707/805, E17.014, E17.108; 715/512, 715/202, 211
See application file for complete search history.

(56) References Cited

U.S. PATENT DOCUMENTS

| 6,480,783 | B1 * | 11/2002 | Myr ............................. 701/117 |
| 6,523,021 | B1 | 2/2003 | Monberg et al. |
| 6,662,356 | B1 | 12/2003 | Edwards et al. ............. 717/113 |
| 6,950,821 | B2 * | 9/2005 | Faybishenko et al. ....... 707/688 |
| 6,983,310 | B2 * | 1/2006 | Rouse et al. .................. 709/206 |
| 7,065,769 | B1 * | 6/2006 | Tolopka ......................... 719/321 |
| 7,240,049 | B2 * | 7/2007 | Kapur .............................. 707/3 |
| 2001/0053145 | A1 * | 12/2001 | Willars et al. ................ 370/352 |
| 2002/0049756 | A1 * | 4/2002 | Chua et al. ....................... 707/4 |
| 2003/0093470 | A1 | 5/2003 | Upton ........................... 709/203 |
| 2003/0145047 | A1 | 7/2003 | Upton ........................... 709/203 |

(Continued)

OTHER PUBLICATIONS

Paepcke et al. "Search Middleware and the Simple Digital Library Interoperability Protocol" D-Lib Magazine, Mar. 2000, vol. 6, No. 3.*

(Continued)

*Primary Examiner* — Tamara T Kyle
*Assistant Examiner* — Berhanu Mitiku
(74) *Attorney, Agent, or Firm* — Conversant Wireless Licensing (57) ABSTRACT

The invention provides an apparatus, a method, a computer program product and an electronic device where, in accordance with the method there includes steps of implementing a search mediator function that is interposed between a plurality of applications and a plurality of search functions; and operating the search mediator function for receiving search queries from individual ones of the plurality of applications, forwarding received search queries to appropriate ones of the plurality of search functions, and providing search results to respective ones of the plurality of applications in accordance with at least application-specific search profiles.

49 Claims, 4 Drawing Sheets

(56) References Cited

U.S. PATENT DOCUMENTS

| | | | |
|---|---|---|---|
| 2003/0182394 A1* | 9/2003 | Ryngler | G01C 21/3629 709/217 |
| 2004/0128282 A1* | 7/2004 | Kleinberger et al. | 707/3 |
| 2004/0143644 A1* | 7/2004 | Berton et al. | 709/217 |
| 2004/0193940 A1* | 9/2004 | Snyder | G06Q 10/10 714/4.1 |
| 2004/0199643 A1* | 10/2004 | Thompson | G06F 9/5055 709/227 |
| 2004/0203755 A1* | 10/2004 | Brunet et al. | 455/432.1 |
| 2005/0043907 A1* | 2/2005 | Eckel | G01K 1/045 702/62 |
| 2005/0050037 A1* | 3/2005 | Frieder et al. | 707/3 |
| 2005/0076022 A1* | 4/2005 | Wu | G06F 16/951 |
| 2005/0080786 A1 | 4/2005 | Fish et al. | |
| 2005/0097087 A1* | 5/2005 | Punaganti Venkata et al. | 707/3 |
| 2005/0120016 A1 | 6/2005 | Midgley | |
| 2006/0101417 A1* | 5/2006 | Hoh | 717/130 |
| 2006/0168095 A1* | 7/2006 | Sharma et al. | 709/217 |
| 2007/0005576 A1* | 1/2007 | Cutrell et al. | 707/3 |
| 2007/0215696 A1* | 9/2007 | Macnish | 235/380 |
| 2007/0248221 A1* | 10/2007 | Chatterjee et al. | 379/211.02 |

OTHER PUBLICATIONS

Chen et al. "Detecting Web Page Structure for Adaptive Viewing on small Form Factor Devices" www 2003, May 20-24, 2003, Budapest, Hungary. ACM.*

Chang et al. "Efficient WebSearch on Mobile Devices with Multi-Modal Input and Intelligent Text Summarization" www 2002, The Eleventh International World Wide Web Conference Honolulu, Hawaii, May 7-11, 2002.*

Shi et al. "Interoperable Federated Digital library using XML and LDAP" Department of Computer Science, Old Dominion University, Norfolk VA, 2001.*

Asunmaa et al. "Introduction to Mobile Internet Technical Architectural" Wireless Personal Communications pp. 253-259, 2002 (Year: 2002).*

Asunmaa et al. "Introduction to Mobile Internet Technical Architecture"\ Wireless Personal Communications 22: 253-259, 2002. © 2002 Kluwer Academic Publishers. Printed in the Netherlands. (Year: 2002).*

"MITA-Mobile Internet Technical Architecture, Visions and Implementations", vol. 3, pp. 117-118, Nokia, IT Press, 2002 ISBN 951-826-670-0.*

"MITA-Mobile Internet Technical Architecture, Visions and Implementations", vol. 3, pp. 75-76, Nokia, IT Press, 2002, ISBN 951-826-670-0.

Chang Y-S et al: "A new multi-search engine for querying data through an Internet search service on CORBA" Computer Networks, Elsevier Science Publishers B.V., Amsterdam, NL, vol. 34, No. 3, Sep. 1, 2000 (Sep. 1, 2000), pp. 467-480, XP004304733. ISSN: 1389-1286. * the whole document *.

Supplemental European Search Report, Application No. PCT/IB2006/001916, dated Oct. 19, 2009.

* cited by examiner

METHOD, APPARATUS AND COMPUTER PROGRAM PRODUCT PROVIDING AN APPLICATION INTEGRATED MOBILE DEVICE SEARCH SOLUTION USING CONTEXT INFORMATION

TECHNICAL FIELD

The teachings in accordance with the exemplary embodiments of this invention relate generally to communications systems and devices that enable access to a network, such as the Internet, and more specifically relate to techniques for enabling a user to execute a search for desired information and content.

BACKGROUND

End users may search for many things in the Internet domain, and there are currently several search solutions, such as Google™, to facilitate the search process.

Currently to perform a search from a mobile device, such as a cellular telephone, the user employs a browser function, irrespective of what type of content the user is trying to search. In general, a mobile browser may be considered to be an application in a mobile device whose main function is to show content on a display and, based on a request generated by user interaction with the displayed content or programmed features of the content itself, fetch new content from a location specified by the request (see, for example, "MITA-Mobile Internet Technical Architecture, Visions and Implementations", Volume 3, pages 75-76, Nokia, IT Press, 2002, ISBN 951-826-670-0).

One mobile device browser, the Series 60™ browser available from the assignee of this patent application, permits the user to access search provider sites via the Internet. A separate application may be provided, a "contacts" application, to search for contact information within the device.

As should be apparent, a problem arises in that there are typically a plurality of different applications on a mobile device, and the different applications may have different search needs and may also support different data types. It should thus be appreciated that executing all application searches from a browser function is not an optimum solution. That is, a browser may not be an optimum search tool for all of the possible applications that may wish to perform searching for information and content.

SUMMARY OF THE EXEMPLARY EMBODIMENTS

The foregoing and other problems are overcome, and other advantages are realized, in accordance with the non-limiting and exemplary embodiments of this invention.

In one exemplary aspect thereof this invention provides an apparatus that includes a search platform comprised of a search mediator. The search mediator comprises an application interface for coupling to applications for receiving a search query from at least one application and for providing search results to the at least one application. The search mediator further includes a plurality of interfaces for coupling to a plurality of different search functions and to a memory that stores at least application-specific search profiles for use by the search mediator during at least one of responding to a received search query and providing search results.

In another exemplary aspect thereof this invention provides a computer program product embodied on a computer readable medium that comprises program instructions the execution of which perform operations that implement a search platform. The operations include implementing a search mediator function that is interposed between a plurality of applications and a plurality of search functions; and operating the search mediator function for receiving search queries from individual ones of the plurality of applications via an application interface, forwarding received search queries to appropriate ones of the plurality of search functions, and providing search results to respective ones of the plurality of applications via the application interface in accordance with at least application-specific search profiles.

In another exemplary aspect thereof this invention provides a method that includes implementing a search mediator function that is interposed between a plurality of applications and a plurality of search functions; and operating the search mediator function for receiving search queries from individual ones of the plurality of applications, forwarding received search queries to appropriate ones of the plurality of search functions, and providing search results to respective ones of the plurality of applications in accordance with at least application-specific search profiles.

In a further exemplary aspect thereof this invention provides an electronic device having application interface means and search mediator means coupled to the application interface means and to a plurality of search means. The search mediator means receives search queries from individual ones of a plurality of applications via the application interface means, forwards received search queries to appropriate ones of the plurality of search means, and outputs search results to respective ones of the plurality of applications in accordance with at least application-specific search profiles stored in memory means.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

In general, in accordance with conventional practice applications tend to provide their own search functionality for a user to perform searches within the application, and there is no integrated search engine on the device that accepts a search query and performs searches transparently across multiple applications within the device or via other search medium. The exemplary embodiments of this invention rectify these and other shortcomings.

Figure 1:
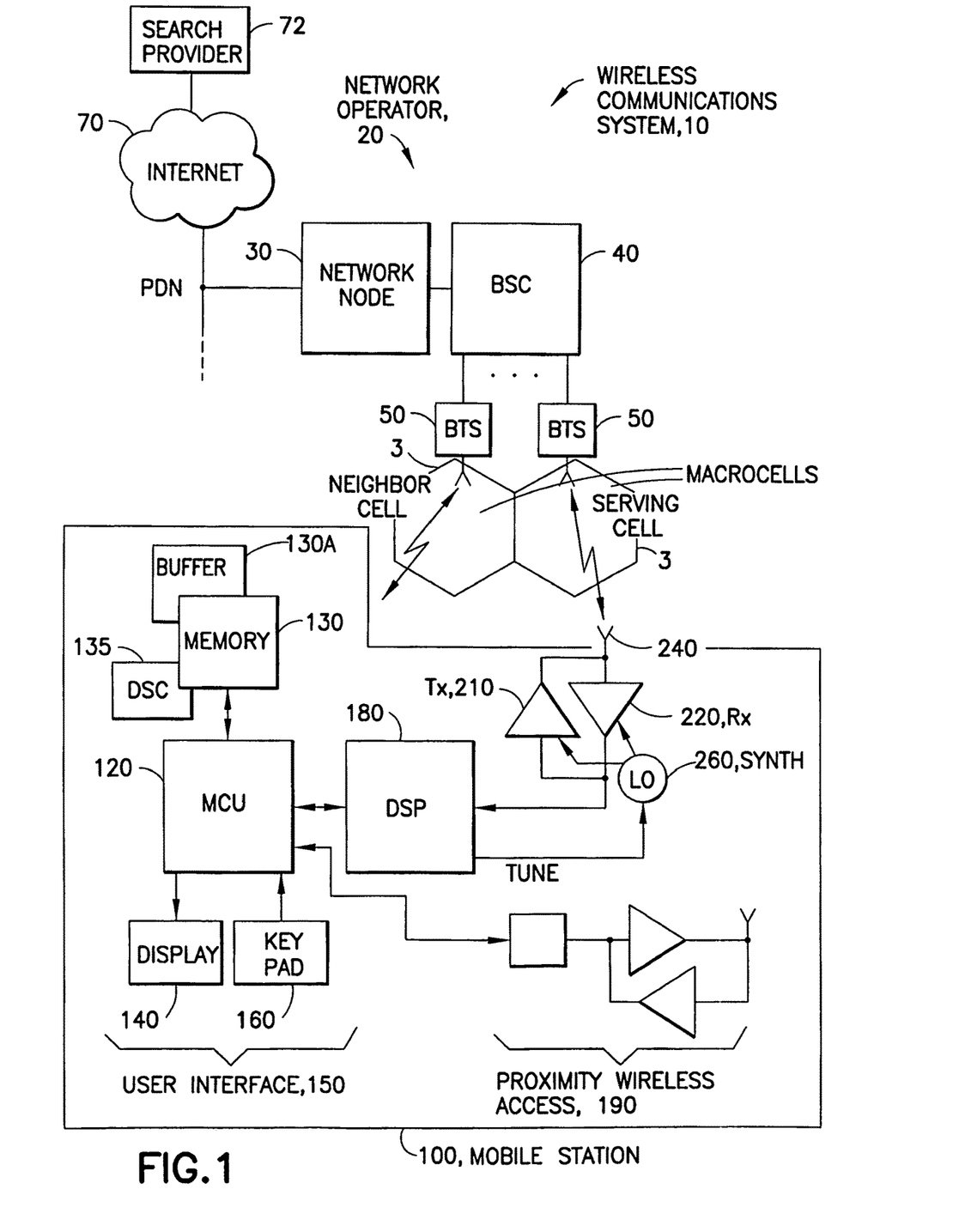
FIG. 1 shows a simplified block diagram an embodiment of a wireless communications system that is suitable for practicing this invention.

By way of introduction, and referring to FIG. 1, there is shown as a simplified block diagram an embodiment of a wireless communications system 10 that is suitable for practicing this invention. The wireless communications system 10 includes at least one mobile device or mobile terminal, also referred to herein as a mobile station (MS) 100. FIG. 1 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 70 access and web page downloads. The Internet 70 also enables access to at least one search service or provider 72, such as a world wide web (WWW) search provider, as will be described in further detail below with regard to direct web service plug-ins 320 (see FIG. 2). The air interface standard may be compatible with a code division multiple access (CDMA) air interface standard, such as one known as cdma2000, although this is not a limitation upon the practice of this invention.

The MS 100 typically includes a control unit or control logic, such as a microcontrol unit (MCU) 120 having an output coupled to an input of the display 140, such as an LCD or a plasma display, and an input coupled to an output of a user input device or devices 160, as non-limiting examples, a keyboard or keypad. In other embodiments the display 140 may be a touch sensitive display, and may also then comprise a part of, or all of, the user input device 160. The user input 160 may also be implemented in whole or in part with voice recognition technology. The display/user input together provide a user interface (UI) 150 whereby a user is enabled to interact the MS 100, including interaction with the enhanced search capabilities provided by the exemplary embodiments of this invention, as discussed below.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. At least some of this temporary data can be stored in a data buffer 130A. The operating program is assumed, for the purposes of this invention, to enable the MCU 120 to execute the software routines, layers and protocols required to implement the methods in accordance with the exemplary embodiments of this invention, as well as to provide a suitable UI with a user. Stored in the memory is assumed to be at least one software component or product that implements a dedicated search client (DSC) 135, as described more fully below in relation to FIGS. 2 and 3.

Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 210 and a receiver 220, both of which are coupled to an antenna 240 for communication with the network operator. At least one local oscillator, such as a frequency synthesizer (SYNTH) 260, can be provided for tuning the transceiver. Data, such as digitized voice and packet data, is transmitted and received through the antenna 240.

The MS 100 may also include a short range, proximity (local area) wireless access component or sub-system 190, such as one based on Bluetooth, that enables connectivity with devices (e.g., PCs and home entertainment devices) in the proximity of the MS 100. The proximity wireless access sub-system 190 may also be used for contacting a local area search provider reachable through a wireless local area network. The proximity wireless access sub-system 190 may be implemented using a low power radio frequency transceiver or an infrared (IR) transceiver.

The memory 130 may be of any type suitable to the local technical environment and may be implemented using any suitable data storage technology, such as semiconductor-based memory devices, magnetic memory devices and systems, optical memory devices and systems, fixed memory and removable memory. The data processors 120, 180 may be of any type suitable to the local technical environment, and may include one or more of general purpose computers, special purpose computers, microprocessors, DSPs and processors based on a multi-core processor architecture, as non-limiting examples.

In general, the various embodiments of the MS 100 can include, but are not limited to, cellular telephones, personal digital assistants (PDAs), portable computers, image capture devices such as digital cameras, gaming devices, music storage and playback appliances, Internet appliances permitting Internet access and browsing, as well as portable units or terminals that incorporate combinations of such functions. The MS 100 may be contained within a card or module that is connected during use to another device. For example, the mobile station 10 could be contained within a PCMCIA or similar type of card or module that is installed during use within a portable data processor, such as a laptop or notebook computer.

In the exemplary embodiments of this invention there is provided a common search component/framework solution, referred to as the DSC 135, that provides a single search component to enable search functionality on the mobile device. The search component provides a search service to other applications, and also provides a search service to a user via the user interface. In addition, there is provided a search Application Program Interface (API) which may be published for third parties to add search functionality to their applications on the mobile device.

In the exemplary embodiments of this invention the DSC 135 is integrated with MS 100 applications, and the API is defined to integrate the DSC 135 to the applications in the MS 100.

Figure 2:
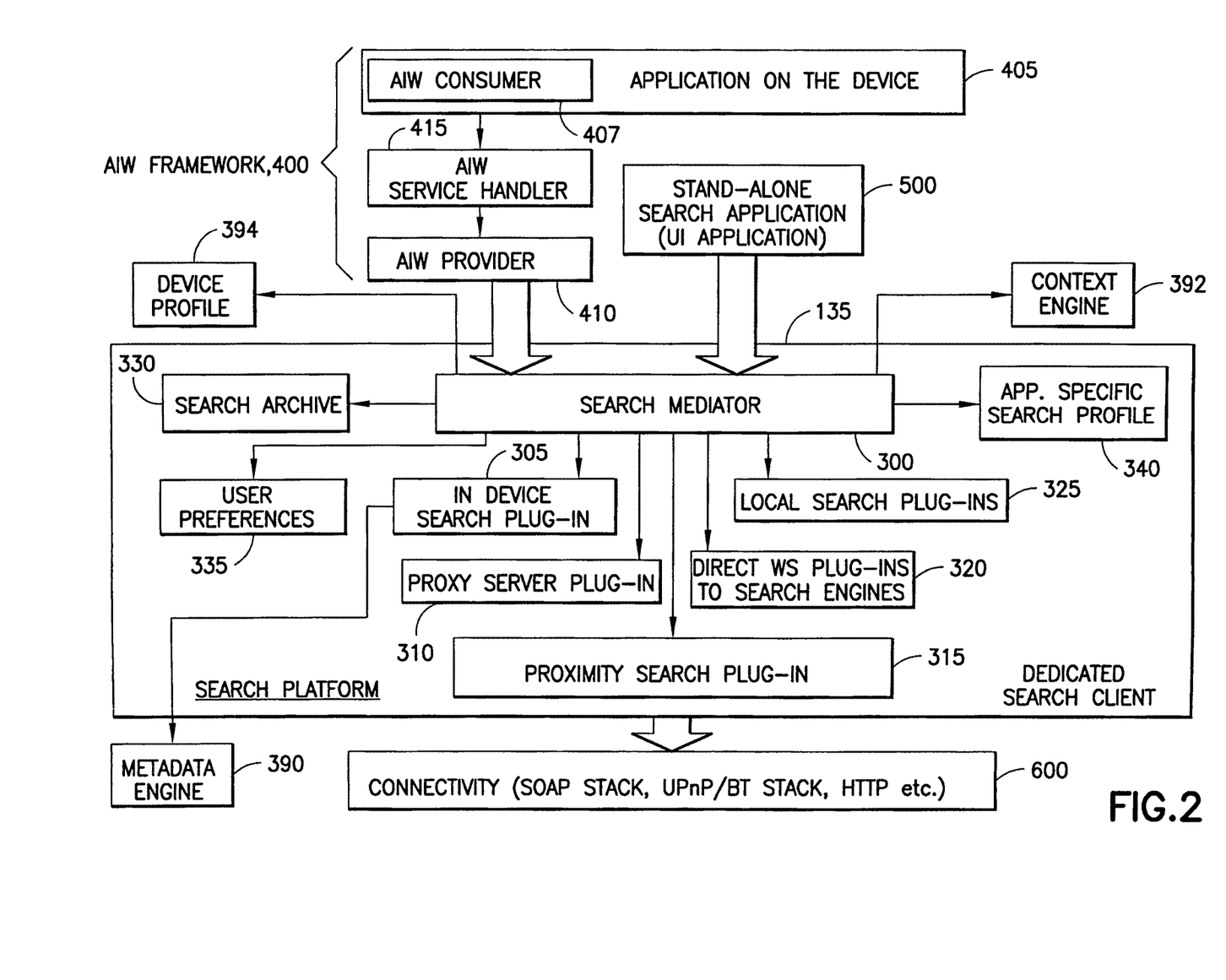
FIG. 2 is a block diagram of a dedicated search client, which may also be referred to as a search platform, that includes a search mediator in accordance with exemplary embodiments of the invention.

Referring now to FIG. 2, the DSC 135, which may also be referred to as a search platform, includes a search mediator 300 as a central, unifying component of the overall search architecture. The search mediator 300 serves to unify the functionality of the search platform architecture, and it functions as a single access point to the search platform for applications and the user, as well as decoupling search complexity from the client (application or user). The search mediator 300 also functions as an integrating unit for different processing functions of the overall search processing. These different processing functions may include, as non-limiting examples, query encoding and decoding, result formatting, connectivity to one or more of the search providers or search services 72 in the Internet 70, resolving the complexity of searching in different search zones such as in-device, proximity (e.g., using the proximity wireless access component 190) and Internet 70, as well as providing search history management and archiving.

It can be noted that the processing functionality implemented by the search mediator 300 is not restricted to the foregoing, and that this approach enables adding new functionality without affecting the clients of the DSC 135. To accomplish this the search mediator 300 provides in the exemplary embodiments of this invention a plug-in approach to add via defined interfaces or sockets new search providers and search-related functionality.

In this regard there may be an in-device search plug-in 305 by which searching within the device (e.g., within the MS 100) can be enabled through the search platform. This component interacts with a metadata engine 390 that provides, as a non-limiting example, searching in-device media using different types of input, as described in further detail below. Non-limiting examples of meta-data include, but are not limited to, descriptive information relating to a stored file, such as an image, video or audio file. The descriptive information (i.e., the meta-data) may include one or more of: when the file was created, who created the file, the size of the image or audio file and with whom the user has previously shared the file.

The DSC 135 may be further provided with a proxy server plug-in 310 by which one or more Internet search providers 72 can be enabled using a single access point. This approach is beneficial for several reasons. For example, the proxy server plug-in 310 is useful in executing both enterprise searches and also operator centric searches, where the network operator 20 provides an Internet search as a service to the end user. In this approach the complexity is moved to the server of the network operator 20, thus enabling the client on the MS 100 to be a thin (reduced complexity) client.

The DSC 135 may be further provided with a proximity search plug-in 315 that enables searching within the proximity of the device (e.g. the MS 100) using appropriate connectivity 600, for example, Universal Plug and Play (UPnP) or a Bluetooth (BT) stack, or any other current or future proximity connectivity technology. The DSC 135 may also use SOAP (Simple Object Access Protocol) that employs both XML and HTTP to provide an interoperable way to invoke methods on remote computers. For example, the SOAP operates by encoding a method invocation request as an XML document, sending the XML document to an appropriate server using HTTP, and then waiting for the response from the server, also encoded as an XML document. The proximity wireless access sub-system 190 may provide the physical link for the proximity search plug-in 315.

Reference with regard to the interface to the connectivity block 600 may be made to copending and commonly assigned U.S. patent application Ser. Nos. 10/700,365, Nov. 30, 2003, "System and Method for Providing a Unified Framework for Service Discovery", by Murali Krishna Punaganti Venkata and Franklin Reynolds, United States Patent Application Publication US2005/0097087 A1. This commonly assigned patent application discloses a Service Discovery (SD) agent that provides uniform and integrated service discovery operation, whereby a default connection to a SD Engine (SDE) may be automatically initiated to aid in service discovery. User agents (UA) are installed to implement various SDP interfaces as required. A canonical query transform component transforms user queries from a query generation tool to the appropriate protocol as needed for the SD interfaces. Likewise, service discovery results from the SD interfaces are translated by canonical query transform into user friendly results for ultimate display to a user interface.

The teachings of this invention may employ the same or a similar service discovery agent and interface, although the exemplary embodiments of this invention are not limited for use with this particular service discovery functionality.

The DSC 135 may be further provided with a direct web service plug-in(s) 320, whereby one or more search engines provide a web service interface to their respective search services. For example, Google™ and Yahoo™ are examples of search providers 72 who provide a web service interface to their search services. The direct web service plug-ins 320 enable the implementation of the search service of those service providers who provide web service. Each direct web service plug-in 320 corresponds to one search service 72. Note that this may be considered as a thick client approach, in contrast to the thin client proxy-server plug-in 310 approach, and that the unified architecture of the DSC 135 accommodates the use of both. Depending on the business requirements and models both approaches can be enabled or any one approach can be enabled.

The DSC 135 may be further provided with a local search plug-in 325, where "local search" in this content implies a geographically local search, that is, searching for services in a particular geographical location (e.g., searching for restaurants in New York, or movies in Toronto). Conceptually, the local search plug-in 325 may overlap with the proxy server plug-in 310 and also with the direct web service plug-in 320, and a local search may also be enabled by either.

Also associated with the DSC 135 can be a search archive 330, for storing information related to previous searches, a list of user (search) preferences 335, and application-specific search profiles 340, each of which is described in further detail below.

The overall search functionality discussed above may be accessed by different applications in the MS 100 using an Application InterWorking (AIW) framework 400. The AIW framework 400 enables interworking of the MS 100 applications 405 (which can comprise at least one AIW consumer 407) using, as a non-limiting example, a publisher-consumer model. An AIW provider 410 functions as the publisher component and provides search functionality to be utilized by the applications 405. The AIW provider 410 serves as a proxy to the search mediator 300. A plurality of AIW providers can be implemented to enable provisioning different search functionality for different AIW consumers 407.

A general reference with regard to application interworking can be made to "MITA-Mobile Internet Technical Architecture, Visions and Implementations", Volume 3, pages 117-118, Nokia, IT Press, 2002, ISBN 951-826-670-0. Techniques for applications to communicate with one another include the use of a global content storage that can be accessed by any application, direct data exchange, and publishing a request for a service that is responded to by any application(s) capable of fulfilling the requirements of the request.

The applications 405 can include, as non-limiting examples, user Contacts (e.g., based on an address book), a Media gallery enabling the display and/or playback of various media content, and a Browser.

An AIW service handler 415 functions as a service handler implementation as defined in the AIW framework, and is interposed between the AIW consumer 405 and the AIW provider 410.

A given AIW consumer 407 is a matching component to a corresponding AIW provider 410. Other applications in the MS 100 may use the AIW consumer 407 to access the search functionality. In general, the AIW consumer 407 will form a part of an application 405.

An example of a simple query to the search mediator 300 from the application API may be as follows:
a: an identification of the application originating the query;
b: a keyword (e.g., a string of characters); and
c: a date/time that the query was generated.

The query could include less than, or more than, this particular information.

Also provided in the MS 100 may be a stand-alone search application 500 that provides a unified search interface for different types of searches, and that is not related to any of the other applications 405. The stand-alone search application 500 provides a single access point to the end-user to perform searching via the UI 150 of the MS 100. Note that in the illustrated exemplary embodiment the stand-alone search application 500 is not implemented as an AIW consumer, and instead interfaces directly with the search mediator 300 of the DSC 135.

The above-noted application specific search profile 340 of the DSC 135 contains profiles specific to particular applications 405, and may contain application-specific information that may be used by the search client. For example, an imaging application 405 of a certain vendor on the MS 100 can provide vendor-specific information such as the vendor's imaging portal uniform resource locator (URL). Note that a third party application provider can provide a search plug-in (e.g., a direct web service plug-in 320) and/or an application specific search profile 340.

The search archive 330 archives searches performed by the user. The archived information may be accessed via the MS 100 UI 150 and reused by the user, and/or this information may be used to identify user behavior and improve the personalization of the DSC 135.

The user preferences 335 stores user preferences and/or settings regarding a user's search. Preferences may be set by the user and/or they may be automatically generated over time after analyzing the user behavior.

The above-noted metadata engine 390 functions as a metadata management system that provides a metadata database to store metadata separately from content, and also provides a unified and consistent API to any kind of metadata for all applications 405. The metadata engine 390 may be used to extend metadata from simple tags to more complex relationships, as well as content usage history.

A context engine 392 provides the context information of an application 405 from where a particular search was initiated. The context engine 392 may be viewed as a central point from where a variety of context information may be provided for the applications 405. As non-limiting examples, the context information may be descriptive of one or more of: a current active profile and sensor-related information indicative of, for example, near-by devices, temperature, ambient illumination and location (e.g., GPS coordinates of the mobile station 100).

A device profile 394 stores the profile of the device (e.g., the MS 100), and provides software and hardware configurations of the device (e.g., specifics of a camera (imaging) subsystem if included the MS 100).

Figure 3:
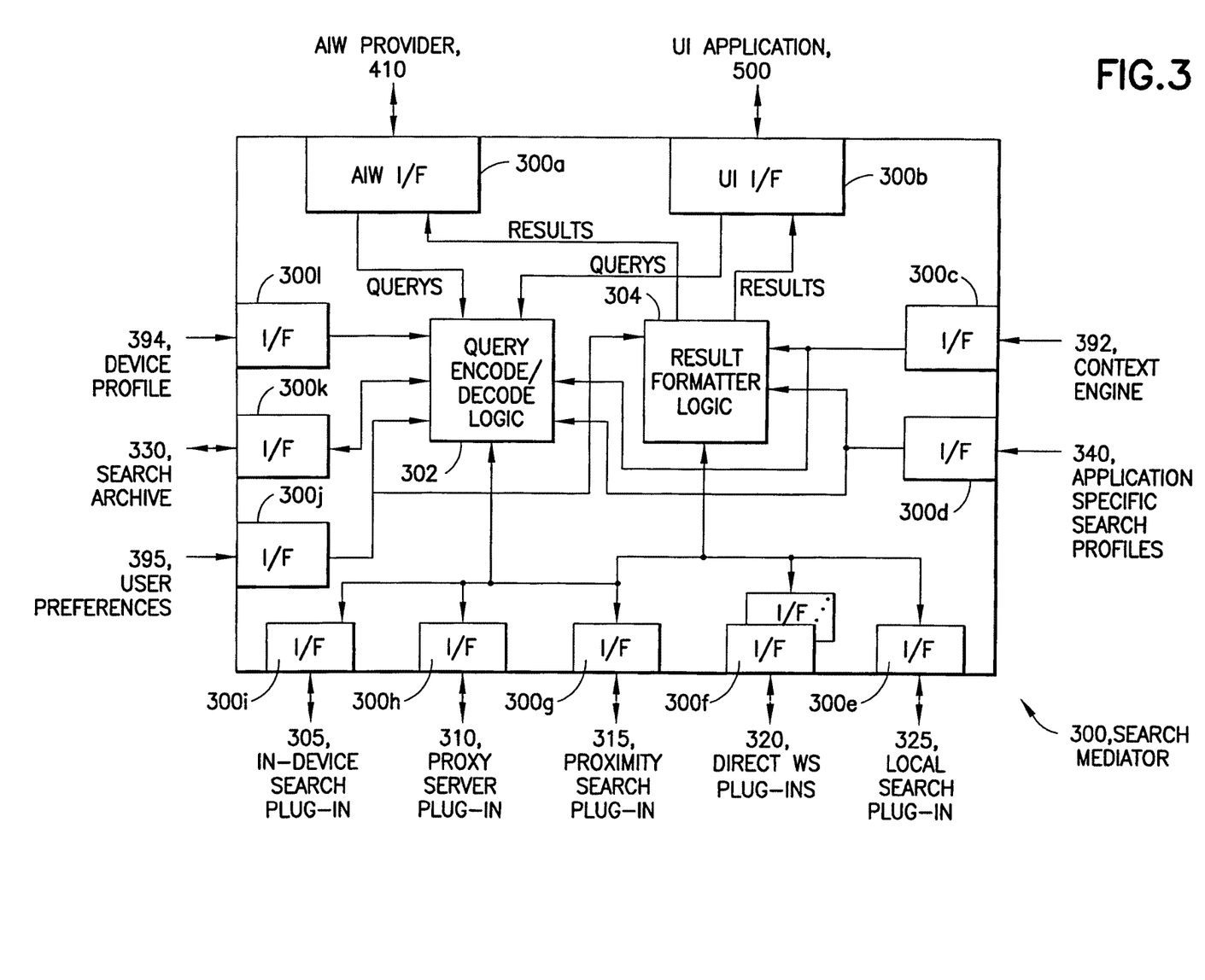
FIG. 3 is a block diagram showing in greater detail a portion of the search mediator shown in FIG. 2.

FIG. 3 is a block diagram that shows in greater detail a portion of the search mediator 300 that is shown in FIG. 2 and described above. The search mediator includes a plurality of interfaces (I/Fs) 300a-300l, including an AIW interface 300a and a UI interface 300b for bi-directional communication with the AIW provider 410 and the UI application 500, respectively. Search queries in various possible formats are received through the interfaces 300a and 300b, and search results in various possible formats are transmitted through the interfaces 300a and 300b. Coupled to the interfaces 300a and 300b are query encode/decode logic 302 and result formatter logic 304. The query encode/decode logic 302 responds to a receipt of a query to select an appropriate search plug-in 305, 310, 315, 320 or 325 via plug-in I/Fs 300i, 300h, 300g, 300f and 300e, respectively, if the search location is not explicitly defined by the received query, to place or transform the query into a format expected by the selected or specified one of the search plug-ins, and to route the query to the selected or specified one of the plug-ins 305, 310, 315, 320 or 325. To aid in the process of plug-in selection and query encoding the query encode/decode logic 302 can receive inputs from one or more of the device profile 394, search archive 330, user preferences 335, context engine 392 and application-specific search profiles 340 via I/Fs 300l, 300k, 300j, 300d and 300c, respectively. Note that the search archive I/F 330 may be bi-directional to enable reading archived search-related information, as well as updating the archived information. The result formatter logic 304 receives query results through the plug-in I/Fs 300i, 300h, 300g, 300f and 300e, transforms or formats the results, if needed, into a format expected by the requesting application 405 or user, and routes the formatted results to the original query generator via either the AIW interface 300a or the UI interface 300b. To aid in the process of query result formatting the result formatter logic 304 can receive inputs from one or more of, for example, the user preferences 335, context engine 392 and application-specific search profiles 340 via I/Fs 300j, 300d and 300c, respectively.

The query encode/decode logic 302 and result formatter logic 304 may be implemented as computer programs, or as logic circuits, or as a combination of programs and circuits. The functionality of the various interfaces 300a-300l may also be implemented as computer programs, or as logic circuits, or as a combination of programs and circuits. This is true at least for the reason that some degree of intelligence may be desired in each of these interfaces to accommodate the specific needs, data types, message formats, etc., of the attached plug-in or data repository (e.g., device profile 394 and search archive 330).

Note that FIG. 3 and the foregoing description of same is meant to be exemplary of one possible embodiment of the search mediator 300, and is not intended to be construed in a limiting sense. For example, more or less than the indicated interfaces may be present.

It should be appreciated that the DSC 135 may function as a stand-alone application, or the functionality of the DSC 135 may be wholly or partially integrated into another application or applications. The DSC 135, and the search mediator 300 in particular, provide a unified search component to perform in-device, proximity, local and/or web searching for the user or for applications 405 of the MS 100. The DSC 135 provides flexibility for the user to perform searching in any zone (in-device, local, proximity or web search). The use of the DSC 135 enables providing the user with a personalized search experience that is facilitated at least in part by the use of search archive 330 and/or the user preferences 335. In addition, search results may be shared with another user or users via the proximity wireless access sub-system 190 (e.g., using Bluetooth, IrDA or Multi-Media Messaging (MMS) technologies). The use of the DSC 135 also provides a consumer API which can be used by third party applications to access and use the search functionality. The use of the DSC 135 further enables search invocation or initiation based on profiles, times, user preferences and other context information such as location of the MS 100 (as determined by, for example, a location functionality provided in the MS 100, such as GPS, or external to the MS 100, such as one provided by the network operator 20, such as cell location). The use of the DSC 135 further supports both synchronous and asynchronous searching.

In this regard a synchronous search implies that when a query is given by the user or an application 405, the results are provided substantially immediately, whereas an asynchronous search implies that when the query is provided at some point in time, the search results are provided at some later point in time (e.g., within the hour, or the next day, etc.) The results may also be provided when some criterion or criteria are fulfilled, such as when some threshold number of search results have been obtained, or when the user's active profile changes state to some predetermined profile, e.g., the provisioning of the search results is delayed to satisfy some predetermined condition. The various search criteria and/or conditions may be stored in, as non-limiting examples, the user preferences 135 and/or in the application specific search profile 340.

An advantage that results from the use of the exemplary embodiments of the invention is that the context of the MS 100 can be considered for the search function. Another advantage that results from the use of the exemplary embodiments of the invention is that APIs to third party applications are provided. Another advantage that results from the use of the exemplary embodiments of the invention is that local, proximity and web searching can be performed in a unified and if desired an integrated manner. Another advantage that results from the use of the exemplary embodiments of the invention is that search result can be shared amongst a community of users. Another advantage that results from the use of the exemplary embodiments of the invention is that it provides an avenue for better targeted advertisements from third parties. Another advantage that results from the use of the exemplary embodiments of the invention is that synchronous and asynchronous searching is made possible.

Further advantages that result from the use of the exemplary embodiments of the invention include enhanced ease of use, and an ability to readily integrate search functionality to any application 405 on the device (including third party applications). Further advantages that result from the use of the exemplary embodiments of the invention include enhanced management of the content on the device, as the content is searched from the application 405 that consumes the content. This provides an opportunity to exploit, save or manage the content in an improved manner, since it can be assumed that the application 405 has knowledge of how the content retrieved from the search can best be handled.

Figure 4:
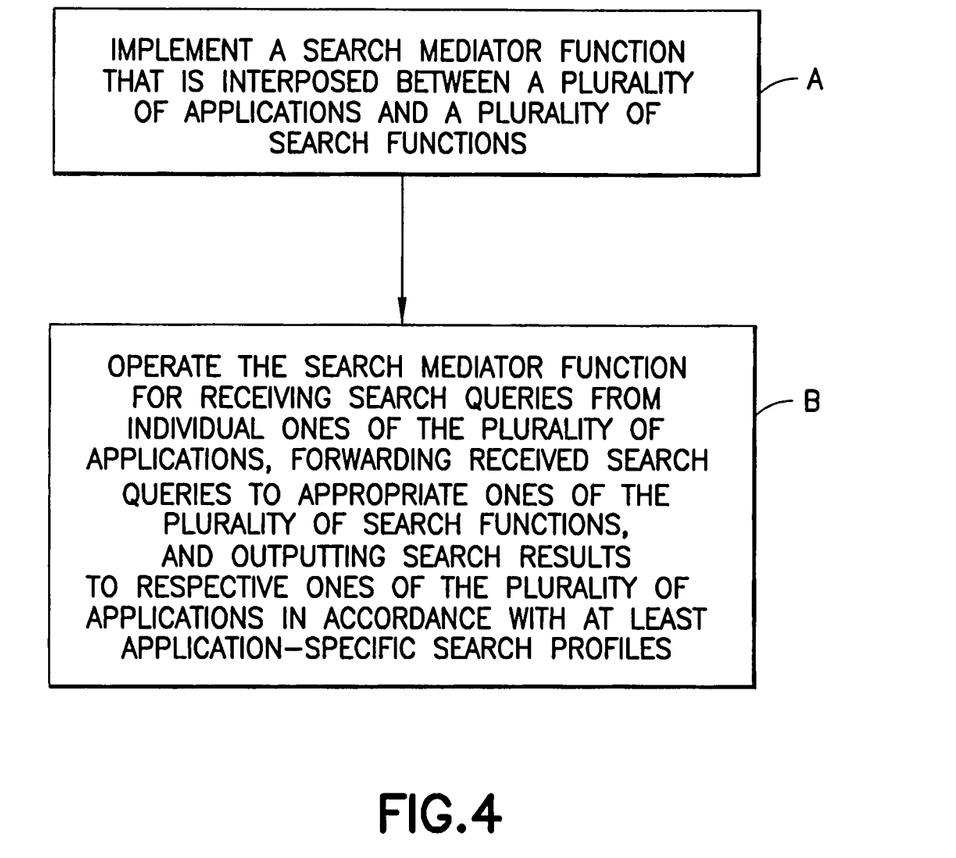
FIG. 4 shows a logic flow diagram that is indicative of a method executed in accordance with non-limiting embodiments of the invention.

Referring to FIG. 4, in accordance with an exemplary embodiment of the invention there is provided a method that includes: (A) implementing the search mediator function 300 that is interposed between the plurality of applications 405 and the plurality of search functions, such as those exemplified by blocks 305, 310, 315, 320 and 325 in FIG. 2; and (B) operating the search mediator function 300 for receiving search queries from individual ones of the plurality of applications 405, forwarding received search queries to appropriate ones of the plurality of search functions, and providing search results to respective ones of the plurality of applications 405 in accordance with at least application-specific search profiles 340.

Various modifications and adaptations may become apparent to those skilled in the relevant arts in view of the foregoing description, when read in conjunction with the accompanying drawings and the appended claims. As but some examples, the use of other similar or equivalent browser and/or document viewers may be attempted, and the use of more or less than the numbers and types of interfaces and plug-ins may be attempted by those skilled in the art. However, all such and similar modifications of the teachings of this invention will still fall within the scope of this invention.

It should be further noted that the embodiments of this invention may be implemented by computer software executable by a data processor of the MS 100, such as the MCU 120, or by hardware circuitry, or by a combination of software and hardware circuitry. Further in this regard it should be noted that the various blocks of the logic flow diagram of FIG. 4 may represent program steps, or interconnected logic circuits, blocks and functions, or a combination of program steps and logic circuits, blocks and functions for performing the specified tasks.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. An apparatus comprising:
one or more processors; and
memory for storing program instructions executable by the one or more processors, the program instructions arranged as:
a plurality of applications, the memory also for storing at least one search profile specific to one or more of a plurality of applications, at least one of the plurality of applications including an application interworking consumer component;
an application interworking provider component for providing search functionality to the application interworking consumer component of one of the plurality of applications; and
a search platform comprised of a search mediator, said search mediator comprising:
query encode/decode logic;
result formatter logic;
an application interworking interface configured to receive search queries from the plurality of applications in various formats, couple the query encode/decode logic and the result formatter logic to the application interworking provider component, and provide search results back to the at corresponding ones of the plurality of applications in the various formats,
a search profile interface configured to couple the query encode/decode logic to the memory to receive a search profile from the plurality of applications;
a plurality of search interfaces configured to couple the query encode/decode logic and the result formatter logic to a plurality of different search functions; and
at least one memory interface configured to couple the query encode/decode logic to the memory;
wherein the program instructions corresponding to the query encode/decode logic, when executed, cause the one or more processors to perform a plurality of operations comprising:

receive a search query from one of the plurality of applications via the application interworking provider component;

receive a search profile specific to the application;

responsive to the search query, select a search function from among the plurality of different search functions;

transform the search query into a format applicable to the selected search function; and route the received search query to the selected search function wherein either or both of the select and transform operations is performed based on the search profile of the application.

2. The apparatus as in claim 1, said search mediator further comprising a UI interface configured to couple the query encode/decode logic to a user interface, to receive a search query from the user interface, and to provide search results to the user interface, and where the memory stores at least one user-specific search preference for use by said search mediator during at least one of responding to a received search query from the user interface and providing search results to the user interface.

3. The apparatus as in claim 1, wherein the program instructions corresponding to the result formatter logic, when executed, cause the one or more processors to:

transform search results received from the selected search function, at least partially in accordance with the search profile for the application, into a search result format suitable for the application; and route the formatted search results to the application via the application interworking provider component.

4. The apparatus as in claim 1, wherein the program instructions are further arranged to include a context engine providing context information for the plurality of applications;

wherein the context information comprises sensor-related information and a current active profile for the application; and wherein either or both of the select and transform operations is performed based also on either or both of the sensor-related information and the current active profile for the application.

5. The apparatus as in claim 1, where the memory further stores meta-data;

and wherein either or both of the select and transform operations is performed based also on the meta-data.

6. The apparatus as in claim 1, where the memory further stores a search archive of one or more previously performed searches;

and wherein either or both of the select and transform operations is performed based also on one or more previously performed searches from the search archive.

7. The apparatus as in claim 1, where said plurality of different search functions comprise a proximity search function operable to conduct a search within an area proximate to an electronic device wherein the search platform is embodied.

8. The apparatus as in claim 1, where said plurality of different search functions comprise a local search function that is related to a specified geographical area.

9. The apparatus as in claim 1, where said plurality of different search functions comprise an in-device search function associated with an electronic device wherein the search platform is embodied.

10. The apparatus as in claim 1, where said plurality of different search functions comprise a search provider reachable through a network external to an electronic device wherein the search platform is embodied.

11. The apparatus as in claim 10, where the search provider is reachable at least partially through a wireless link.

12. The apparatus as in claim 11, where the wireless link is comprised of a cellular communications wireless link.

13. The apparatus as in claim 11, where the wireless link is comprised of a short range wireless link.

14. The apparatus as in claim 1, where said plurality of different search functions comprise a world wide web (WWW) search provider.

15. The apparatus as in claim 1, where said plurality of search interfaces comprise a plurality of plug-in interfaces.

16. The apparatus as in claim 15, where at least one search function comprises a plug-in search function provided by a party other than a party that provides an electronic device wherein the search platform is embodied.

17. The apparatus as in claim 1,
wherein said query encode/decode logic and said result formatter logic cooperate to provide asynchronous searching.

18. The apparatus as in claim 1, embodied in a mobile station.

19. The apparatus as in claim 1, where the memory is also for storing a profile of the apparatus comprising software and hardware configuration information of the apparatus;

and wherein the either or both of the select and transform operations is performed based also on the profile of the apparatus.

20. The apparatus as in claim 1, wherein the sensor-related information comprises one or more of near-by devices, temperature, ambient illumination, and location of the apparatus.

21. A non-transitory computer readable storage medium embodying a program of instructions, the execution of which performs operations that implement a search platform, the operations comprising:

implementing a search mediator function interposed between a plurality of applications and a plurality of search functions, at least one of the plurality of applications including an application interworking consumer component; and operating the search mediator function to:

receive a search query from one of the plurality of applications in a corresponding format via an application interworking interface, each of the plurality of applications corresponding to a separate format;

receive a search profile specific to the one of the plurality of applications;

responsive to the search query, select one of the plurality of search functions;

transform the search query into a format applicable to the selected search function;

transform search results received from the selected search function to the format corresponding to the one of the plurality of applications in accordance with the search profile specific to the one of the plurality of applications; and application route the formatted search results to the application via the application interworking interface;

wherein one or more of the select and transform operations is performed based on the search profile specific to the one of the plurality of applications.

22. The computer readable memory as in claim 21, where the search mediator function is further interposed between a user interface and the plurality of search functions, and where operating the search mediator function includes receiving a search query from the user interface, forwarding a received search query to an appropriate one of the plurality of search functions, and providing a corresponding search result to the user interface in accordance with at least a user-specific search profile.

23. The computer readable memory as in claim 21, wherein operating the search mediator function further comprises receiving context information for the application, the context information comprising sensor-related information and a current active profile for the application;
and wherein one or more of the select and transform operations is performed based also on either or both of the sensor-related information and the current active profile for the application.

24. The computer readable memory as in claim 21, where operating the search mediator function further comprises using meta-data;
and wherein one or more of the select and transform operations is performed based also on the meta-data.

25. The computer readable memory as in claim 21, where operating the search mediator function further comprises using a search archive of one or more previously performed searches;
and wherein one or more of the select and transform operations is performed based also on one or more previously performed searches from the search archive.

26. The computer readable memory as in claim 21, where said plurality of search functions comprise a proximity search function operable to conduct a search within an area proximate to an electronic device wherein the search platform is embodied.

27. The computer readable memory as in claim 21, where said plurality of search functions comprise a local search function related to a specified geographical area.

28. The computer readable memory as in claim 21, where said plurality of search functions comprise an in-device search function associated with an electronic device wherein the search platform is embodied.

29. The computer readable memory as in claim 21, where said plurality of search functions comprise a search provider reachable through a network external to an electronic device wherein the search platform is embodied.

30. The computer readable memory as in claim 29, where the search provider is reachable at least partially through a wireless link.

31. The computer readable memory as in claim 30, where the wireless link is comprised of a cellular communications wireless link.

32. The computer readable memory as in claim 30, where the wireless link is comprised of a short range wireless link.

33. The computer readable memory as in claim 21, where said plurality of search functions comprise a world wide web (WWW) search provider.

34. The computer readable memory as in claim 21, where said plurality of interfaces comprise a plurality of plug-in interfaces.

35. The computer readable memory as in claim 34, where at least one search function comprises a plug-in search function provided by a party other than a party that provides an electronic device wherein the search platform is embodied.

36. The computer readable medium as in claim 21, embodied in a mobile station.

37. The computer readable medium as in claim 21, wherein the sensor-related information comprises one or more of near-by devices, temperature, ambient illumination, and location of the apparatus.

38. A method comprising:
implementing, by an apparatus, a search mediator function interposed between a plurality of applications and a plurality of search functions, at least one of the plurality of applications including an application interworking consumer component; and
operating, by the apparatus, the search mediator function to:
receive a search query from one of the plurality of applications in a corresponding format via an application interworkinq interface, each of the plurality of applications corresponding to a separate format;
receive search profiles specific to one or more of the plurality of applications;
responsive to the search query from the one of the plurality of applications, select one of the plurality of search functions;
transform the search query into a format applicable to the selected search function;
transform search results received from the selected search function to the format corresponding to the one of the plurality of applications in accordance with a search profile specific to the one of the plurality of applications; and
route the formatted search results to the application via the application interworking interface;
wherein one or more of the select and transform operations is performed based on the search profile specific to the one of the plurality of applications.

39. The method as in claim 38, further comprising interposing the search mediator function between a user interface and the plurality of search functions, and where operating the search mediator function includes receiving a search query from the user interface, forwarding a received search query to an appropriate one of the plurality of search functions, and providing a corresponding search result to the user interface in accordance with at least a user-specific search profile.

40. The method as in claim 38, wherein the operating of the search mediator function further comprises receiving context information for the application, the context information comprising sensor-related information and a current active profile for the application;
and wherein one or more of the select and transform operations is performed based also on the current active profile for the application, on meta-data and on one or more previously performed searches from a search archive.

41. The method as in claim 38, where the plurality of search functions comprise at least one of a proximity search function operable to conduct a search within an area proximate to an electronic device wherein the search platform is embodied, an in-device search function associated with the electronic device wherein the search platform is embodied, a search provider reachable through a network external to the electronic device wherein the search platform is embodied, and a local search function related to a specified geographical area.

42. The method as in claim 41, where the search provider is reachable at least partially through a wireless link.

43. The method as in claim 42, where the wireless link is comprised of a cellular communications wireless link.

44. The method as in claim 42, where the wireless link is comprised of a short range wireless link.

45. The method as in claim 41, where the search provider is embodied as a world wide web (WWW) search provider.

46. The method as in claim 38, where the plurality of interfaces comprise a plurality of plug-in interfaces.

47. The method as in claim 46, where at least one search function comprises a plug-in search function provided by a party other than a party that provides an electronic device wherein the search platform is embodied.

48. The method as in claim 38, where the method is implemented by a mobile station comprising the search mediator function.

49. The apparatus as in claim 38, wherein the sensor-related information comprises one or more of near-by devices, temperature, ambient illumination, and location of the apparatus.

* * * * *